US008558182B2

(12) United States Patent
Chi et al.

(10) Patent No.: US 8,558,182 B2
(45) Date of Patent: Oct. 15, 2013

(54) OPTICAL ELEMENT, DEVICE, METHOD, AND APPLICATIONS

(75) Inventors: Wanli Chi, Rochester, NY (US); Nicholas George, Pittsford, NY (US)

(73) Assignee: University of Rochester, Rochester, NY (US)

( * ) Notice: Subject to any disclaimer, the term of this patent is extended or adjusted under 35 U.S.C. 154(b) by 573 days.

(21) Appl. No.: 12/898,060

(22) Filed: Oct. 5, 2010

(65) Prior Publication Data
US 2011/0085051 A1 Apr. 14, 2011

Related U.S. Application Data

(60) Provisional application No. 61/250,224, filed on Oct. 9, 2009.

(51) Int. Cl.
*G02F 1/35* (2006.01)
(52) U.S. Cl.
USPC ............... 250/363.06; 250/336.1; 250/338.1; 250/363.01; 250/365; 382/204; 382/278; 382/279; 382/280; 382/282
(58) Field of Classification Search
USPC .................................................. 250/363.06
See application file for complete search history.

(56) References Cited

U.S. PATENT DOCUMENTS

| | | | |
|---|---|---|---|
| 3,700,895 A | 10/1972 | Dicke | |
| 4,209,780 A | 6/1980 | Fenimore et al. | |
| 4,360,797 A | 11/1982 | Fenimore et al. | |
| 4,389,633 A | 6/1983 | Fenimore et al. | |
| 6,737,652 B2 * | 5/2004 | Lanza et al. | 250/363.06 |
| 2003/0152290 A1 * | 8/2003 | Odell | 382/291 |
| 2006/0274308 A1 * | 12/2006 | Brady et al. | 356/326 |
| 2007/0263914 A1 * | 11/2007 | Tibbetts | 382/129 |
| 2009/0020714 A1 * | 1/2009 | Slinger | 250/550 |
| 2009/0095912 A1 * | 4/2009 | Slinger et al. | 250/363.06 |
| 2012/0027173 A1 * | 2/2012 | Duerr | 378/62 |

OTHER PUBLICATIONS

Chi et al. Phase-coded aperture for optical imaging, 2009, Optics Communications, 282, 2110-2117.*

* cited by examiner

*Primary Examiner* — David Porta
*Assistant Examiner* — Djura Malevic
(74) *Attorney, Agent, or Firm* — William Greener; Bond, Schoeneck & King, PLLC

(57) ABSTRACT

A novel phase-coded aperture, associated imaging system, and design method is disclosed. The optical imaging system includes a coded-aperture followed optically by a detector array and includes an image processor. A diffraction pattern in the form of a band-limited uniformly redundant array is formed on the detector array when focusable radiation from a point source in object space is modulation by the transmission function of the coded-aperture. Since diffraction effects cannot be ignored in the optical regime, an iterative phase retrieval method is used to calculate the phase-coded aperture transmission function. Correlation type processing can be applied for the image recovery.

28 Claims, 9 Drawing Sheets (a)

(b)

(c)

OPTICAL ELEMENT, DEVICE, METHOD, AND APPLICATIONS

CROSS-REFERENCE TO RELATED APPLICATIONS

This application claims priority to U.S. provisional Patent Application Ser. No. 61/250,224 filed on Oct. 9, 2009, the content of which is incorporated herein by reference in its entirety.

FEDERALLY SPONSORED RESEARCH

This invention was made with government support from the U.S. Army Research Office under contract number W911NF-09-1-0425. The government has rights in this invention.

BACKGROUND OF THE INVENTION

1. Field of the Invention

Embodiments of the present invention relate generally to coded aperture optics, systems, and methods operable with and pertaining to focusable radiation and, more particularly, to an optical element for generating a band-limited uniformly redundant array (bl-URA) from light within a spectrum of focusable radiation, an optical imaging device incorporating the optical element, and a method for determining a transmission function $P(\xi, \eta)$ for an optical element that will generate a desired intensity pattern $A(x,y)$ on a detector from light within a spectrum of focusable radiation from a point on an object.

2. Technical Background

Conventional refractive and reflective optical components (e.g., lenses, mirrors) are not useful for imaging nonfocusable radiation such as, e.g., γ-rays and X-rays. The comparatively shorter wavelengths simply do not refract in the more suitable manner of comparatively longer wavelengths in, e.g., the visible spectrum. However, a simple pinhole camera can be used as an imaging device for γ-rays and X-rays because diffraction effects are minimal, in contrast to those effects in the UV to sub-millimeter and, particularly the visible, regime, which cannot be ignored.

The concept of using a coded aperture to image nonfocusable radiation was first introduced by L. Mertz and N. Young, Proc. Conf. Optical Instruments and Techniques, London 1961, p. 305 and later implemented with random arrays by R. H. Dicke, Astrophys. J. 153, L 101 (1968) and J. G. Ables, Proc. Astron. Soc. Aust. 4, 172 (1968); see also U.S. Pat. No. 3,700,895). In the formulation by Dicke and Ables, the opening of a single pinhole camera was replaced by many randomly arranged pinholes collectively known as the aperture. Each point of a self-luminous object projected a shadow of the aperture on a recorded image plane (picture). Subsequent correlation processing of the picture yielded a reconstructed image that resembled the original self-luminous objects.

Uniformly redundant arrays (URAs) used for coded aperture imaging were first disclosed by Edward E. Fenimore et al. in U.S. Pat. No. 4,209,780 as well as in Applied Optics, 17, p. 337, Feb. 1, 1980, Applied Optics, 17, p. 3562, Nov. 16, 1978, Applied Optics, 18, p. 945, Apr. 1, 1979, and in Los Alamos Scientific Laboratory Mini-Review, LASL-78-102, January 1979. U.S. Pat. Nos. 4,360,797 and 4,389,633 disclose further information about coded aperture imaging.

A variety of coded aperture systems pertaining to the optical regime are reported in David P. Casasent, Timothy Clark (Ed.), Proc. SPIE 6714 (2007); David P. Casasent, Stanley Rogers (Ed.), Proc. SPIE 7096 (2008); Keith Lewis, Proc. SPIE 6714 (2007) 671402; and Tim Clark, Esko Jaska, Proc. SPIE 6714 (2007) 671403.

The inventors have recognized the many benefits and advantages realizable by a coded aperture optics operable over the focusable radiation spectrum.

SUMMARY

An embodiment of the invention is an optical element for generating a band-limited uniformly redundant array (bl-URA) from light within a spectrum of focusable radiation. The embodiment includes an optical element characterized by a light transmission function, $P(\xi, \eta)$, such that light within the spectrum of focusable radiation incident on the optical element from a point location in an object space of the optical element is optically transformed by $P(\xi, \eta)$ into a band-limited uniformly redundant array (bl-URA), $A(x,y)$, in an image space of the optical element. The optical element may consist of only a single optical element. The optical element may have a surface region that is at least partially transmissive for the light within the spectrum of focusable radiation. The optical element may have a surface region that is at least partially reflective for the light within the spectrum of focusable radiation. The optical element may be an amplitude-only aperture. The optical element may be a phase-only aperture. The optical element may be a combination amplitude/phase aperture. The optical element may consist of a single refractive optical component. The optical element may consist of a plurality of refractive optical components. The optical element may comprise a refractive optical component and a phase aperture. The optical element may be a programmable spatial light modulator. According to the embodiment, $A(x,y)$ is a real, non-negative, band-limited, uniformly redundant array (bl-URA). The spectrum of focusable radiation is in a range from ultraviolet to sub-millimeter wavelengths. The spectrum of focusable radiation may be in a range from visible to infrared wavelengths.

An embodiment of the invention is an optical imaging device. The optical imaging device includes an optical element characterized by a light transmission function, $P(\xi, \eta)$, such that light within the spectrum of focusable radiation incident on the optical element from a point location in an object space of the optical element is optically transformed by $P(\xi, \eta)$ into a band-limited uniformly redundant array (bl-URA), $A(x,y)$, in an image space of the optical element; a detector disposed in the image space such that the bl-URA is formed on the detector; and an image processor adapted to recover an image of an object from the detected bl-URA. According to the embodiment, $A(x,y)$ is a real, non-negative, band-limited, uniformly redundant array (bl-URA).

An embodiment of the invention is a method for determining a transmission function $P(\xi, \eta)$ for an optical element that will generate a desired intensity pattern $A(x,y)$ on a detector from light within a spectrum of focusable radiation from a point on an object. The method includes the steps of: determining a real, non-negative, band-limited uniformly redundant array, $A(x,y)$, that will be generated on a detector by an optical element characterized by a transmission function $P(\xi, \eta)$, from light within the spectrum of focusable radiation from a point on the object; defining an electric field having an amplitude $E(x,y)=[A(x,y)]^{1/2}$; calculating the transmission function $P(\xi, \eta)$ in a plane immediately adjacent a known position of the optical element by performing a free space back propagation, and denoting the transmission function $|P(\xi, \eta)|\exp[i\phi(\xi,\eta)]$; determining an electric field at a known detector plane location by performing a free space propagation, and denoting this electric field $F(x,y)\exp[i\psi(x,y)]$;

applying a detector plane intensity constraint by setting $F(x,y) \rightarrow [A(x,y)]^{1/2}$; performing another free space back propagation; and calculating the optical element transmission function $P(\xi, \eta)$ that will generate the desired intensity pattern $A(x,y)$. According to an illustrative aspect in which the optical element is a phase-only element, the method includes the further steps of: setting an aperture constraint such that $|P(\xi, \eta)|$ is set to 1, after the step of calculating the transmission function $P(\xi, \eta)$; and repeating the steps of: calculating the transmission function $P(\xi, \eta)$ in a plane immediately adjacent a known position of the optical element by performing a free space back propagation, and denoting the transmission function $|P(\xi, \eta)|\exp[i\phi(\xi,\eta)]$; determining an electric field at a known detector plane location by performing a free space propagation, and denoting this electric field $F(x,y)\exp[i\psi(x,y)]$; applying a detector plane intensity constraint by setting $F(x,y) \rightarrow [A(x,y)]^{1/2}$; and performing another free space back propagation. According to another illustrative aspect in which the optical element is an amplitude-only element, the method includes the further steps of: setting an aperture constraint by setting $\phi(\xi, \eta)$ to 0, after the step of calculating the transmission function $P(\xi, \eta)$; and repeating the steps of: calculating the transmission function $P(\xi, \eta)$ in a plane immediately adjacent a known position of the optical element by performing a free space back propagation, and denoting the transmission function $|P(\xi, \eta)|\exp[i\phi(\xi,\eta)]$; determining an electric field at a known detector plane location by performing a free space propagation, and denoting this electric field $F(x,y)\exp[i\psi(x,y)]$; applying a detector plane intensity constraint by setting $F(x,y) \rightarrow [A(x,y)]^{1/2}$; and performing another free space back propagation.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF EMBODIMENTS OF THE INVENTION

Reference will now be made in detail to the present exemplary embodiments of the invention, non-limiting examples of which are illustrated in the accompanying drawings. Wherever possible, the same reference numbers will be used throughout the drawings to refer to the same or like parts.

As used herein, the term "focusable" radiation or light when used in conjunction with the embodied optical element for generating a band-limited uniformly redundant array (bl-URA), means electromagnetic radiation spanning the UV through IR spectrum, which can be focused by a refractive or a reflective optical component, unlike gamma ($\gamma$)- or X-rays, which are referred to in the art as nonfocusable radiation. The term "focusable" radiation or light, when used in conjunction with the embodied optical imaging device, additionally refers to wavelengths for which diffraction effects are no longer negligible, as understood in the art.

The exemplary optical element and imaging device embodiments described in detail below will be discussed, for convenience, substantially in terms of a transmission-type phase-only coded aperture optical element and imaging device using same. However, a person skilled in the art would appreciate that reflection-based elements and systems as well as amplitude-only and combination amplitude/phase optical elements, all of which operate under the same basic principles as the transmission-type phase-only coded aperture optical element and imaging device, are merely alternative aspects and are covered as if fully and expressly set forth herein. That is, in the optical element embodiment, all of the various aspects referred to immediately above will be characterized by a light function, $P(\xi, \eta)$, such that light within the spectrum of focusable radiation incident on the optical element from a point location in an object space of the optical element is optically transformed by $P(\xi, \eta)$ into a band-limited uniformly redundant array (bl-URA), $A(x,y)$, in an image space of the optical element. Thus the term 'light transmission function' represented by $P(\xi, \eta)$ is used herein without limitation to a 'transmission-type' coded-aperture optical element, imaging device, and method, but is equally applicable to reflection-based aspects as well.

Figure 1A:
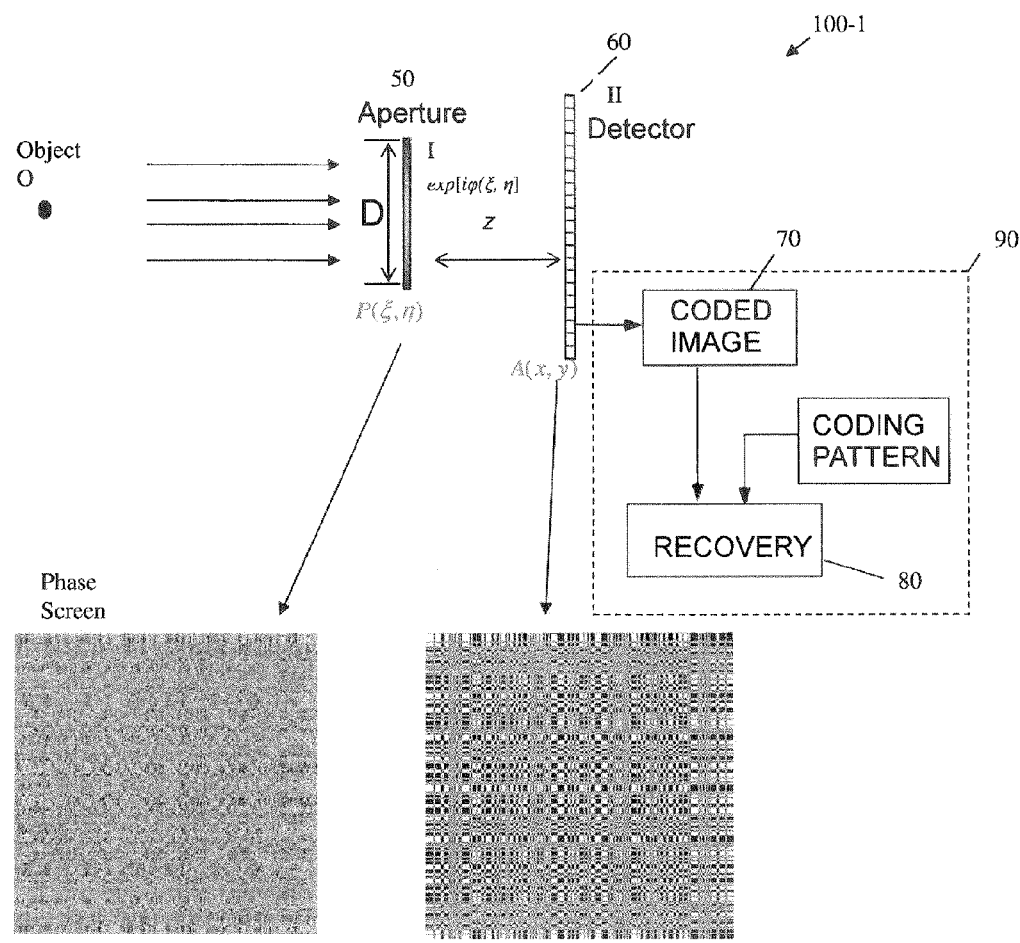
FIG. 1A shows a schematic diagram of a coded aperture imaging system in which the optical element is a transmission-type phase-only coded aperture, according to a non-limiting, illustrative embodiment of the invention.

FIG. 1A schematically illustrates a transmission-type phase-coded optical imaging system 100-1 and includes an optical phase-only screen 50, also referred to herein as a phase-coded aperture optical element. An object having an object point O is shown in FIG. 1A since the system 100 is an 'imaging' system; however, the object O is not part of the embodied invention per se.

Focusable light from a point O in the object (i.e., the object is incoherently illuminated) on an object side (i.e., to the left of the phase-only aperture 50) of the system is incident on the aperture. The phase-only aperture 50 has an aperture D and a transmission function $P(\xi, \eta)$ that defines the electric field amplitude transmission of the phase-only screen. The electric field at plane I immediately after the phase-only screen for the point object O is represented by $\exp[i\phi(\xi, \eta)]$. The incoming wavefront from the object point O is modulated by the transmission function $P(\xi, \eta)$ of the coded-aperture 50 and forms a specific coded intensity pattern $A(x, y)$ (i.e., a coded image 70; a point spread function (PSF)) on a detector array 60 located at plane II, which is disposed a distance z from plane I. Subsequent image processing of the coded image 70 using iterative phase retrieval methods to perform correlation-type image processing via an image processor 90 (both described in further detail below) leads to recovery 80 of the object.

The exemplary optical imaging device 100-1 illustrated in FIG. 1A can operate as a computational imaging camera. Such a camera essentially consisting only of a coded aperture, a detector array, and an image processor provides a lossless sensitive apparatus that includes, but is not limited to, the following attributes over a traditional camera: lighter weight, ultra-thin device; high resolution with pixel size below the current color cross-talk limit defined by conventional color filters; potential multi-spectral imaging capability in a single CMOS detector; wide dynamic range; wide field of view; potential extended depth of field. These attributes provide benefits and advantages for, but not limited to, the following applications: satellite camera; computational imaging solutions that provide object attributes (e.g., velocity, range) in addition to an image of an object; improved IR imaging solutions that reduce or eliminate the need to thermally compensate IR lens materials; mechanically simple microscopes and telescopes; and ultra-compact consumer cameras.

There are three basic problems associated with and solved by the instant invention: finding an appropriate intensity pattern for the point spread function $A(x, y)$; finding the coded-aperture transmission function $P(\xi, \eta)$ that will generate the corresponding pattern $A(x, y)$ when focusable radiation from a point location in object space is incident on the coded-aperture; and, finding the recovered object by image processing.

According to the embodied invention, the intensity pattern $A(x, y)$ formed on the detector should be similar (but novel as described below) to a uniformly redundant array (URA) as is typically used in an X-ray camera (which is not band-limited), and $P(\xi, \eta)$ will be the transmission function that forms this URA when focusable radiation from a point location in object space is incident on the coded-aperture having such a transmission function. While in the X-ray camera, there is little difference between the aperture transmission pattern $P(\xi, \eta)$ and the detector pattern $A(x, y)$, in the optical regime diffraction effects lead to a marked difference between $P(\xi, \eta)$ and $A(x, y)$. Thus according to a method embodiment described in greater detail below, $P(\xi, \eta)$ for focusable radiation will be calculated from the desired $A(x, y)$.

Since $A(x, y)$ is an intensity pattern formed by diffraction from a finite aperture, D, of $P(\xi, \eta)$, $A(x, y)$ must be real, non-negative, and band-limited. Once $A(x, y)$ is determined, a standard phase retrieval algorithm such as reported by J. R. Fienup, Opt. Lett. 3 (1978) 27 or, by R. Rolleston, N. George, Appl. Opt. 25 (1986) 178 may be used to calculate the coded-aperture transmission function $P(\xi, \eta)$. To begin, let $t(x, y)$ be the binary function for the URA in coded-aperture imaging as described, e.g., by E. E. Fenimore, T. M. Cannon, Appl. Opt. 17 (1978) 337. As shown in the inset in FIG. 2, this pattern has sharp edges and thus is not band-limited. Even though the idealized binary edges are not realizable when diffraction is taken into account, a solution is sought for $A(x, y)$ that is realizable, as follows:

$t(x, y)$ is convolved with a non-negative, band-limited blocking function $b(x, y)$ according to $$A(x,y) = \iint t(\xi, \eta) b(x-\xi, y-\eta) d\xi d\eta \triangleq t(x,y) * b(x,y), \quad (1)$$

where * is the convolution operation. For focusable radiation, $A(x,y)$ must be band-limited with appropriate bandwidth to provide an operable solution for the phase screen transmission function $P(\xi, \eta)$.

For the imaging application as shown in FIG. 1A, for an object $O(x, y)$, the image $I(x, y)$ in a noise-free system can be written as $$I(x,y) = \iint A(x-x', y-y') O(x', y') dx' dy' \triangleq A(x,y) * O(x,y). \quad (2)$$

In the coded image recovery, the estimated object $\breve{O}$ is calculated as the correlation of $I(x,y)$ and $t_R(x, y)$ as:

$$\breve{O}(x, y) = \iint t_R(x', y') I(x-x', y-y') dx' dy' \triangleq I(x,y) \, \Box \, t_R(x,y), \quad (3)$$

where $\Box$ is the correlation operator and $$t_R(x,y) = \iint [t(x-x', y-y') - t_{avg}] \text{comb}(x'/D_x, y'/D_y) dx' dy', \quad (4)$$

in which $D_x$ and $D_y$ are the size of the URA $t(x,y)$ in x and y directions, respectively; and $$t_{avg} = [D_x D_y]^{-1} \int_{-D_x/2}^{D_x/2} \int_{-D_y/2}^{D_y/2} t(x,y) dx dy \quad (5)$$

is the average of the function $t(x,y)$; and $$\text{comb}(x, y) = \Sigma_{ij} \, \delta(x-i, y-j), \quad (6)$$

is a comb function.

Combining Esq. (1)-(4) yields the result of $\breve{O}(x, y)$ as follows:

$$\breve{O}(x, y) = t(x, y) \, \Box \, [t(x, y) - t_{avg}] * \text{comb}(x'/D_x, y'/D_y) * b(x, y) * O(x, y), \quad (7)$$

where the sequence of convolution and correlation operations is from left to right.

Figure 2:
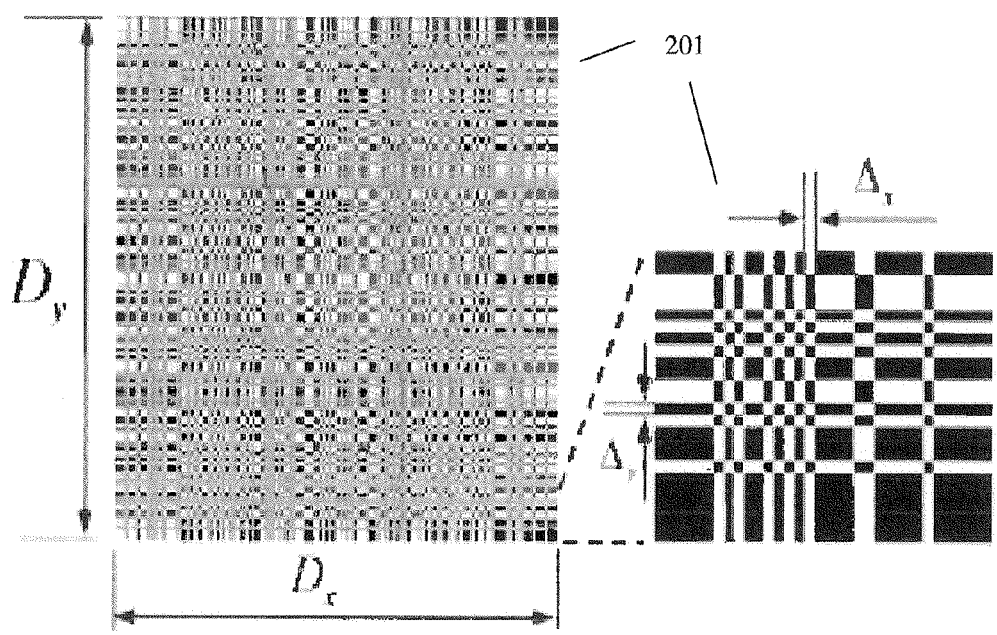
FIG. 2 shows an exemplary uniformly redundant array (URA) as known in the art of X-ray imaging.

The URA $t(x,y)$ as shown in FIG. 2 has the following correlation property:

$$t(x,y) \, \Box \, [t(x, y) - t_{avg}] * \text{comb}(x'/D_x, y'/D_y) = C\text{comb}(x/D_x, y/D_y) * [\Lambda(x/\Delta_x)\Lambda(y/\Delta_y)], \quad (8)$$

where C is a constant, and $\Lambda(x) = \max(1-|x|, 0)$ is a triangle function; as shown in FIG. 2, $\Delta_x$ and $\Delta_y$ are the smallest feature size of the array in x and y directions, respectively. Plotting Eq. (8), one obtains an ideal correlation function with no background variations or "artifacts". This type of cyclic correlation is described in detail in E. E. Fenimore, T. M. Cannon, Appl. Opt. 17 (1978) 337 and represents a considerable advancement over the random array of pinholes reported in R. H. Dicke, Astrophys. J. 153 (1968) L101.

Substituting Eqs. (8) into (7) provides the estimate of object $\breve{O}(x, y)$ as:

$$\breve{O}(x, y) = C\text{comb}(x/D_x, y/D_y) * [\Lambda(x/\Delta_x)\Lambda(y/\Delta_y)] * b(x, y) * O(x, y). \quad (9)$$

Eq. (9) shows the recovered object and its shifted versions. If the field of view is constrained in the following form:

$$-D_x/2 \leq D_x/2 \text{ and } -D_y/2 \leq D_y/2. \quad (10)$$

then there is no overlap in shifted versions of the object and the object $\breve{O}_l(x, y)$ can be recovered as $$\breve{O}_l(x, y) = C[\Lambda(x/\Delta_x)\Lambda(y/\Delta_y)] * b(x, y) * O(x, y). \quad (11)$$

The field of view constraint in Eq. (10) is in image space, i.e., x and y in Eq. 10 are the Cartesian coordinates at the detector plane II.

From Eq. (11), the PSF of the coded aperture system 100-1 in the optical region p(x, y) can be written as:

$$p(x, y) = [\Lambda(x/\Delta_x)\Lambda(y/\Delta_y)]*b(x, y),$$

$$p(x, y) = \iint [\Lambda(x'/\Delta_x)\Lambda(y'/\Delta_y)]b(x-x', y-y')dx'dy'. \quad (12)$$

This point spread function combines both the optical imaging and the correlation type digital processing.

From Eq. (12), the correlation type digital processing yields an image blurred by two parts: the smallest feature size of the uniformly redundant array t(x, y) and the band-limited function b(x, y). In the detection process, the object information with spatial frequencies higher than the band limit of b(x, y) is lost due to diffraction by the phase screen P(x, y) of a finite size. Without extra object constraint, it is beneficial to not remove this blur function b(x, y), even for an imaging system with a diffraction limited lens, in which case b(x, y) is an Airy disk for a circular aperture.

Detailed System Design

The following description explains in detail how to determine A(x, y) for focusable radiation according to an embodiment of the invention. To determine A(x, y), the functions b(x, y) and t(x, y) must be defined.

Defining b(x, y)

For the band-limited function A(x, y), it is advantageous to know the cutoff frequency. Here we note that any signal with finite duration is not considered to be band-limited for the purpose of the instant invention; however, we consider band-limited as used herein as follows.

With reference again to FIG. 1A, we consider only the y-component of the electric field. The incoming field from a point source O is incident on and passes the phase screen 50. Assuming implicit exp(+iωt) dependence at plane I immediately after the phase screen, one can write the electric field as $$E_i(\xi, \eta) = \exp[i\phi(\xi, \eta]. \quad (13)$$

Using Rayleigh-Sommerfield diffraction theory, one can calculate the field at plane II at a distance z from plane I as follows:

$$E_0(x,y,z) = \iint \exp[i\phi(\xi, \eta](e^{-ikR}/2\pi R)(ik+1/R)(z/R)d\xi d\eta, \quad (14)$$

where $R = [z^2 + (x-\xi)^2 + (y-\eta)^2]^{1/2}$.

The spatial spectrum $\check{E}_0(f_x, f_y)$ of the electric field at plane II is defined as $$\check{E}_0(f_x,f_y) = \iint E_0(x,y,z)\exp[-i2\pi(f_x x + f_y y)]dxdy, \quad (15)$$

where $f_x$ and $f_y$ denote the variables in the spatial frequency domain. Substituting Eqs. (14) into (15), $$\check{E}_0(f_x,f_y) = \check{E}_i(f_x,f_y)\exp[-ikz(1-\lambda^2(f_x^2+f_y^2))^{1/2}], \quad (16)$$

where $\check{E}_i(f_x, f_y)$ is the spatial spectrum of the electric field at plane I defined as follows:

$$\check{E}_0(f_x,f_y) = \iint E_0(x,y,z)\exp[-i2\pi(f_x x + f_y y)]dxdy. \quad (17)$$

Eq. (16) is the exact solution of Maxwell's Equations for the y component of the electric field spatial spectrum transfer. The field spatial spectrum is determined by two terms: the spatial spectrum of the field at plane I and the transfer function as shown in the second term of Eq. (16). When the distance between the phase-only screen 50 (plane I) and the detector 60 (plane II) is much larger than the wavelength of illumination k, then the second term of Eq. (16) is subject to the exponential decay for $|f_x^2 + f_y^2| \geq 1/\lambda^2$. As such, the cutoff frequency in the second term is $1/\lambda$.

In principle, the phase screen 50 can be made as fine as possible and there is no cutoff frequency for the first term of Eq. (16). But in an actual system, the diffraction pattern at the detector plane (plane II in FIG. 1A) has to be a finite size so that it can be fully collected by the detector. Thus the cutoff frequency of the first term in Eq. (16) is determined by the optical configurations. In an exemplary aspect, the Cartesian (x, y) dimensions of the URA intensity pattern A(x, y) on the detector 60 are, respectively, half that of the detector dimensions X, Y.

In a thin imaging device configuration, i.e., the distance z between planes I and II in FIG. 1A is smaller than the coded-aperture size D, it is generally the second term of Eq. (16) that will determine the cutoff frequency of the electric field $E_0(x, y)$ at plane II of FIG. 1A. In a thick configuration, z>D, the diffraction limited resolution size $\delta$ at the detector plane (II) can be estimated by the well known formula:

$$\delta = \lambda z/D. \quad (18)$$

Thus the cutoff frequency of $E_0(x, y)$ for a thick configuration can be approximated as $$f_{max} \approx 1/\delta \approx D/\lambda z. \quad (19)$$

From the above analysis, the cutoff frequency $f_{Emax}$ of the electric field $E_0(x, y)$ is $$f_{Emax} \approx \min[1/\lambda, D/\lambda z]. \quad (20)$$

After the cutoff frequency of $E_0(x, y)$ is determined, the cutoff frequency of the intensity pattern A(x, y) at plane II of FIG. 1A can be written as:

$$A(x,y) = |E_0(x,y,z)|^2. \quad (21)$$

From Fourier transform theory, the spatial spectrum of the intensity pattern A(x, y) can be written as an autocorrelation as:

$$\check{A}_0(f_x,f_y) = \iint \check{E}_0(f'_x,f'_y)\check{E}_0(f'_x-f_x,f'_y-f_y)df'_x df'_y \quad (22)$$

Clearly, the cutoff spatial frequency $f_{Amax}$ of the intensity pattern A(x, y) is twice that of the electric field $E_0(x,y,z)$, or, $$f_{Amax} \approx \min[2/\lambda, 2D/\lambda z]. \quad (23)$$

In an actual electronic imaging system, there is one more factor that should be considered in the design of the band-limited intensity pattern A(x, y). The detector array can only sample the pattern in finite intervals. To avoid an aliasing effect, A(x, y) needs to be band-limited up to the Nyquist frequency. Assuming the distance between neighboring pixels of the detector is $\Delta$, then the highest spatial frequency of A(x, y) set by the detector sampling is $1/2\Delta$.

One way to find a nonnegative, band-limited signal A(x, y) is to convolve a not band-limited signal with a non-negative band-limited function b(x, y). b(x, y) must have an upper spatial frequency equal to the cutoff frequency of the pattern A(x, y), which is the lesser value of $f_{Amax}$ as in Eq. (23) and $1/2\Delta$. As one example, b(x, y) can be an intensity point spread function of a diffraction limited lens with an appropriate size finite aperture; the cutoff frequency is then determined by the aperture size of the lens as is well known in Fourier optics.

Defining t(x, y)

In mathematics and X-ray imaging applications, it is well known that the uniformly redundant array has a perfect correlation property, as shown in Eq. (8). That is, the correlation in Eq. (8) does not have background variations that can introduce extra noise in the recovered image even with a noise free detection process. This is an important criterion in the choice of t(x, y). Any pattern with such correlation property as shown in Eq. (8) will work in the system design. In a non-limiting, illustrative aspect, we use a uniformly redundant array as a starting point. A uniformly redundant array is a two dimensional binary array whose cyclic autocorrelation has constant side lobes. One example of the URA in a matrix format, $t_{ij}$ with a size of r×s, is known as follows:

$$t_{ij} = \begin{cases} 0 & \text{if } i = 0, \\ 1 & \text{if } j = 0 \ \& \ i \neq 0, \\ 1 & \text{if } C(r, i)C(s, j) = 1, \\ 0 & \text{otherwise,} \end{cases} \quad (24)$$

where t and s are two prime numbers, r−s=2, and $$C(r, i) = \begin{cases} 1 & \text{if there exists an integer } n, \ 1 \leq n < r, \\ & \text{such that } i = n^2 \cdot \text{mod}(r) \\ -1 & \text{otherwise.} \end{cases} \quad (25)$$

We note that all the cyclic shifted versions of $t_{ij}$ above are also URAs because their cyclic autocorrelation functions have constant sidelobes.

In the instant system design, we choose two parameters in the URA, the feature size of the array $\Delta_x$, $\Delta_y$ and the total array size $D_x$ and $D_y$.

Eq. (12) shows that in order to have the best resolution of the system, $\Delta_x$ and $\Delta_y$ should be as small as possible. However, another limiting factor is that A(x, y), as calculated in Eq. (1), should have good contrast. From Eq. (1), the contrast of A(x, y) is larger for larger feature size of the uniformly redundant array. By considering both Eqs. (1) and (12), one can set $\Delta_x$ and $\Delta_y$ to be about the same as the feature size of b(x, y); or mathematically, $$2\Delta_x f_{xMax} \approx 1 \text{ and } 2\Delta_y f_{yMax} \approx 1, \quad (26)$$

where $f_{xMax}$ and $f_{yMax}$ are the largest spatial frequency of b(x, y) in the x and y directions, respectively.

The total size $D_x$ and $D_y$ of the array t(x, y) can be determined from the field of view constraint in Eq. (10). For a detector with a size of X×Y, Eq. (10) needs to be true for any point (x,y) at detector (|x|<X/2 and |y|<Y/2). This implies that $D_x$ and $D_y$ need to satisfy the following:

$$D_x \geq X/2 \text{ and } D_y \geq Y/2. \quad (27)$$

Calculating the Phase-Only Screen Transmission Function P(ξ, η)

Figure 5:
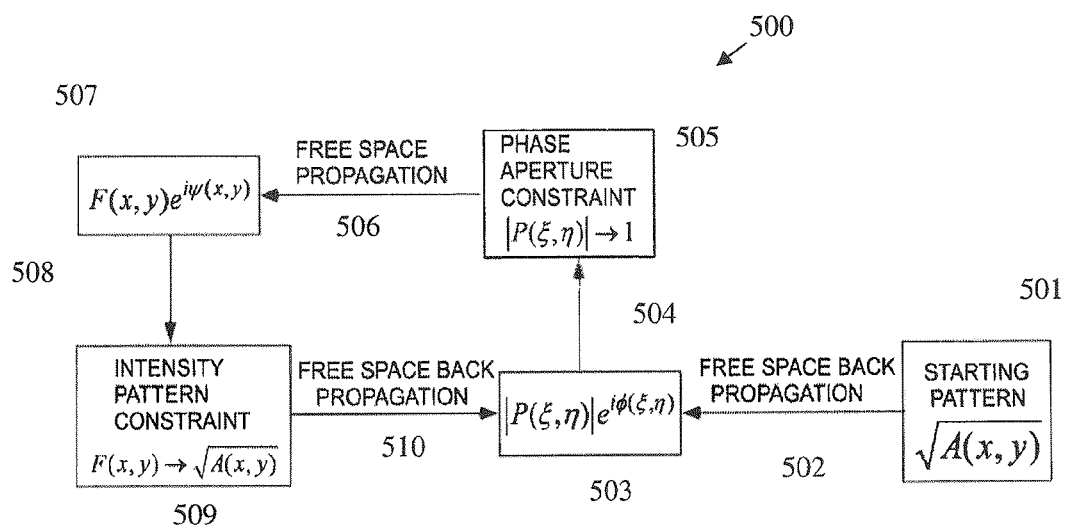
FIG. 5 is a flow chart diagram illustrating the steps of a phase-only screen design method according to a non-limiting, exemplary embodiment of the invention.

After the band-limited intensity pattern A(x, y) is known, the next step in the system design is to calculate an aperture with a transmission function of P(ξ, η) that can be used to generate the specific intensity pattern A(x, y). Although a phase-only type aperture may be preferred in many applications, a phase retrieval process 500 as shown in FIG. 5 can be used for a phase-only type aperture, an amplitude-only type aperture, or a combination amplitude/phase-type aperture, which can be either of a transmission-type or a reflection-type. The calculation method involves an iterative phase calculation.

In FIG. 5, the process 500 starts at step 501 with an electric field having an amplitude of E(x, y)=[A(x, y)]$^{1/2}$. At step 502 a free space back propagation is used to calculate the aperture function at plane I of FIG. 1A. We denote this aperture function as |P(ξ, η)|exp[iφ(ξ, η) at step 503. In order to find a desired phase-only screen, according to an illustrative aspect, we set the aperture constraint, i.e., change |P(ξ, η)| to 1, at step 505. At step 506, a free space propagation is applied to find the electric field at detector plane II as shown in FIG. 1A, at step 507. We denote the thus found electric field as F(x, y)exp[iψ(x, y). The detector plane intensity constraint is then applied at step 509, i.e., change F(x, y) to [A(x, y)]$^{1/2}$. At step 510, we perform another free space back propagation, and the process is repeated. Using this iterative approach, we eventually can calculate a phase-only screen P(ξ, η) that will generate the required intensity pattern A(x, y).

In this algorithm, the free space propagation and back propagation can be simply calculated exactly in the spatial frequency domain using Eq. (16). Therefore this calculation is good in non-paraxial case when, for example, the distance between the screen and detector planes are smaller than the aperture size of the screen (i.e., thin camera configuration).

According to an alternative illustrative aspect, the process 500 can be carried out for an amplitude-only coded-aperture by simply setting the aperture constraint differently, i.e., setting φ(ξ, η) to 0 in step 503, then performing the steps as recited above. According to a further alternative, illustrative aspect in which a combination amplitude/phase aperture is used, only a single iteration is necessary to determine the appropriate transmission function. Thus regardless of the type of phase screen being designed and used, the same rationale controls; i.e., design a coded-aperture system, with or without lens, whose diffraction pattern is a band-limited URA. In this regard, a single or multiple refractive element(s) (e.g., lens(es)) or a combination of lens(es) plus phase mask could be utilized for P(ξ, η) to generate the required intensity pattern A(x, y) for focusable radiation. For example, an optional negative lens with a 1 mm aperture in combination with a phase plate could be used for a 5 mm detector system. Alternatively, an optional positive lens may be used in combination with a phase plate if the size of aperture is larger than half the size of detector.

While phase retrieval algorithms in the above description are generally known in the literature, we note that in our system design some extra data constraints as reported in R. G. Paxman, T. J. Schulz, J. R. Fienup, J. Opt. Soc. Am. A 9 (1992) 1072 may be used in the phase retrieval algorithm to improve the performance of the coded aperture system. As one example, in order to have an extremely wide field of view, we calculate a phase-only screen that can generate a similar intensity pattern for both an on-axis object point and an off-axis point source. Similar extra data constraints may be used to design a system with large depth of field or to reduce the sensitivity of intensity pattern dependence on parameter z, the distance between the phase screen and the detector plane.

Simulation Results

Figure 3:
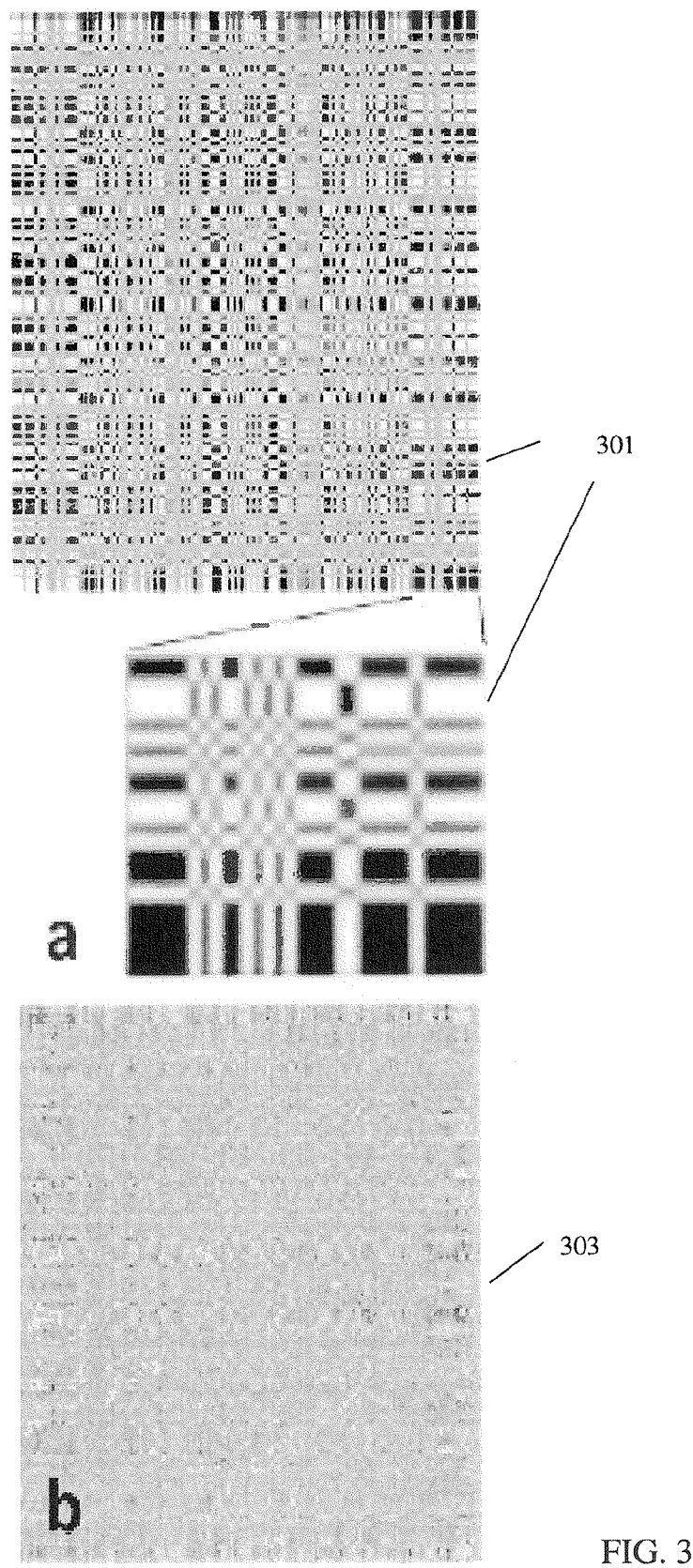
FIGS. 3(a, b) show a digitally constructed point spread function (PSF) from the URA of FIG. 2 and the phase screen used to generate the PSF, respectively, according to an illustrative embodiment of the invention.

In FIG. 3a, we show a realizable band-limited intensity pattern Λ(x, y) 301 at the detector plane (II; not shown). It is the image of the known uniformly redundant array t(x, y) 201 shown in FIG. 2 by a diffraction limited square aperture lens (not shown) and is generated digitally from Eq. (1). A section of the pattern Λ(x, y) 301 is magnified to see the detailed features of such a pattern. The edge is blurred compared to that of the uniformly redundant array 201 in FIG. 2. FIG. 3b shows the corresponding phase function 303 that can generate such a pattern (301) for focusable light from an axial point source at infinity. The phase values from −π to π are shown from dark to bright. In this simulation we use the following parameters: Both the sizes of the pattern Λ(x, y) 301 and phase screen P(x, y) 303 are 2 mm×2 mm, and the distance between the phase screen and the detector is z=5 mm The wavelength of illumination is λ=4 μm.

Figure 4:
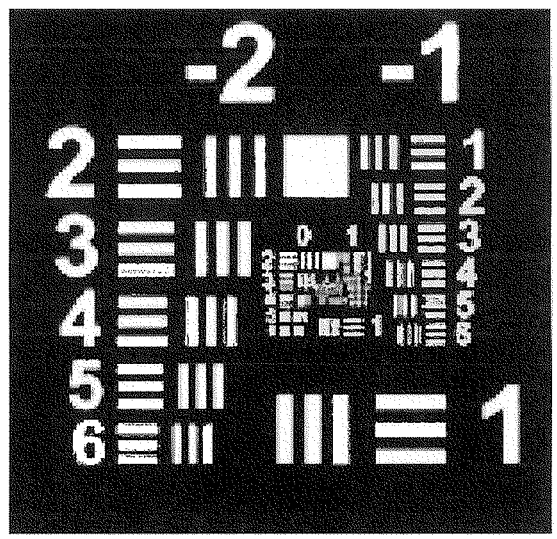
FIGS. 4(a,b,c) show the imaging results of a coded aperture camera according to an illustrative aspect of the invention, specifically (a) the object; (b) the recovered image according to an illustrative aspect of the invention; and (c) a comparative image from a diffraction limited lens.
Figure 4:
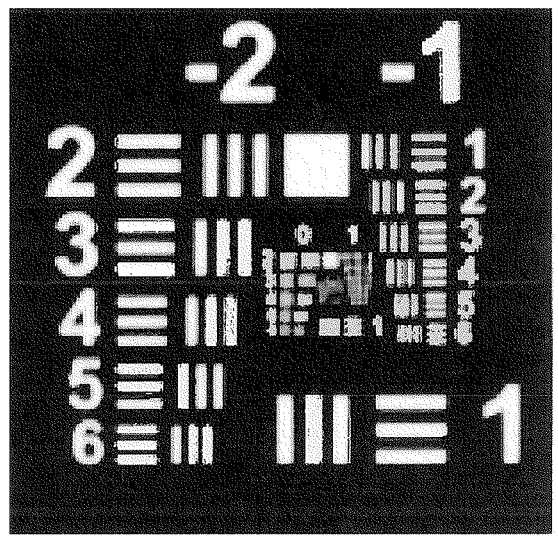
Figure 4:
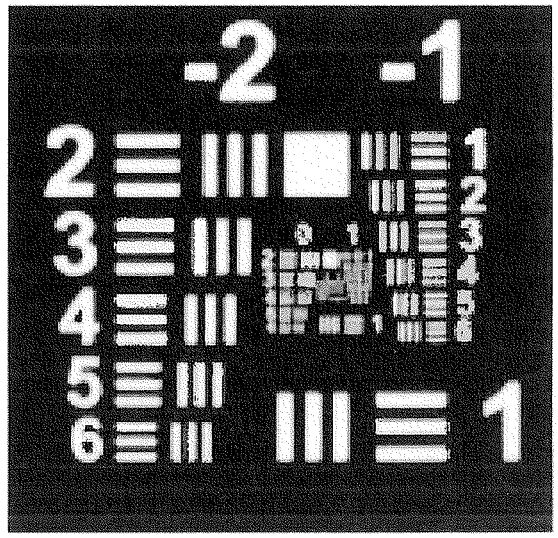

The imaging results are shown in FIGS. 4(a-c). FIG. 4a shows the object used in simulation; FIG. 4b shows the decoded image using the correlation method described herein above; FIG. 4c shows a comparative image formed by a diffraction limited lens with the same square aperture. One can observe the excellent imaging results for the coded aperture system as shown in FIG. 4b. The image of the coded aperture system is a little more blurry than that of the diffraction limited lens because the point spread function of such a system, as in Eq. (12), is wider than that of the diffraction limited system. Some extra digital deconvolution can be applied to the image in FIG. 4b to remove the effect of the triangle blur function in Eq. (12) and recover a diffraction limited result. This extra blur is not a significant disadvantage of the optical region coded aperture imaging system.

Advantageously, embodiments of the systems described herein can be extraordinarily simple. In an illustrative system aspect 100-1 as shown in FIG. 1A, the optical subsystem includes only a phase-only screen 50 followed by a detector array 60 (and image processor 90), while a conventional diffraction limited lens is comparatively difficult to design and fabricate, especially in an ultra-thin format comparable to the instant coded-aperture system. The embodied system works both in the visible and infrared optical region. The simplicity of the embodied infrared system is clearly an advantage compared to conventional infrared imaging systems.

Image Recovery

In addition to the correlation-type processing described with respect to FIG. 5, above, alternative known methods may include photon tagging, linear filtering, maximum entropy, and iterative removal of sources.

Figure 6:
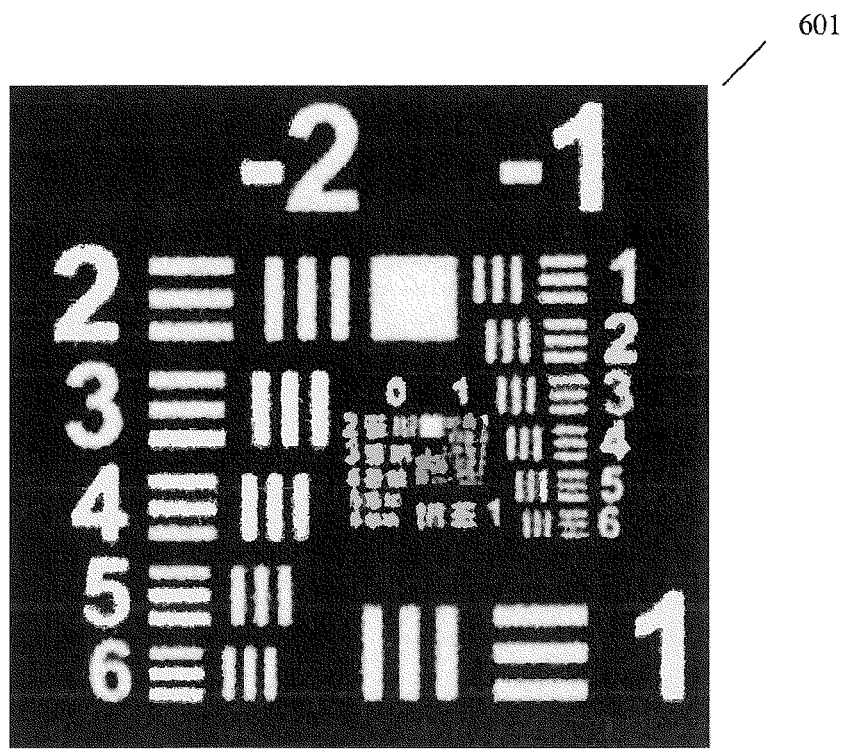
FIG. 6 shows a coded aperture system recovered image according to an illustrative aspect of the invention.

FIG. 6 shows an image 601 recovered using the correlation type processing as described hereinabove and is similar to that shown in the FIG. 4b, except that in FIG. 6 a Gaussian noise is added to the intermediate coded image. The standard deviation of the Gaussian noise is one percent (1%) of that of the signal value of the intermediate image. In the system as shown in FIG. 1A, the detector linear size is twice that of the pattern size A(x, y) (See Eq. 10); the dark and bright structure of the object is not seen in the intermediate image. The intermediate image is bright at the center and it tapers to dark at the edge of the detector. The noise added to the intermediate image has a standard deviation that is one percent of the intermediate image, so the noise added to the center is much larger than the noise added to the edge of the intermediate image.

Figure 7:
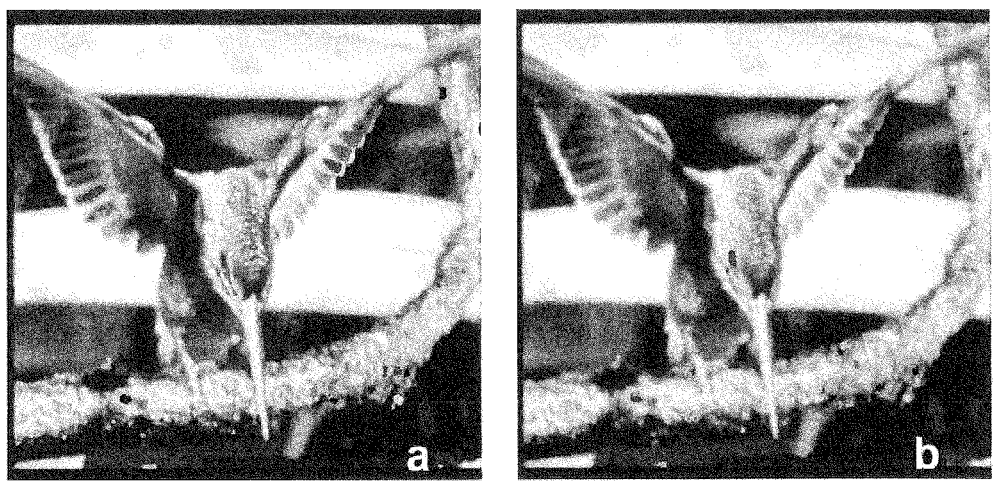
FIG. 7 shows simulated imaging results of a coded aperture system in the optical regime with a grey scale object; specifically, (a) a diffraction limited image and (b) a recovered image using a coded aperture system according to an exemplary aspect of the invention.

In order to illustrate the effectiveness of the instant novel camera system with an image that displays gray scale, FIG. 7 shows the simulated imaging results using the object of a hummingbird. FIG. 7a shows the diffraction limited image taken with a diffraction limited lens with the same aperture size as that of the embodied phase-coded aperture system, i.e., 2 mm×2 mm aperture. The recovered image using the phase-coded aperture system is shown in FIG. 7b. No noise is included in the intermediate image for the coded-aperture system. A careful comparison of the high frequency detail and variable contrast shows excellent image quality. Even small contrast variations in the upper rail of the wooden fence are clearly observed in the image. Although not shown in the figures, good image recovery results were also obtained with 1% noise added to the intermediate image at the detector plane.

Figure 1B:
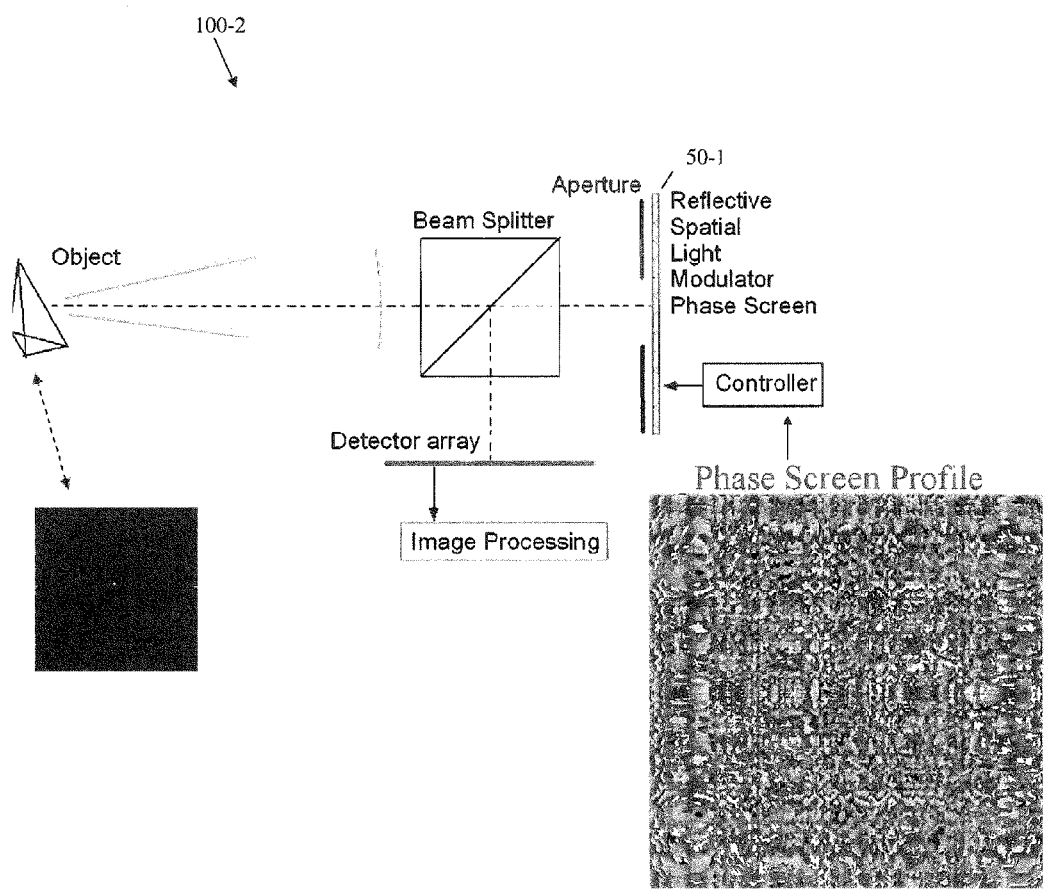
FIG. 1B shows a schematic diagram of a coded aperture imaging system in which the optical element is a reflective spatial light modulator phase screen, according to an alternative, illustrative aspect of the invention.

A phase-only coded-aperture and associated system are illustrative embodiments of the invention. As mentioned above, in alternative illustrative aspects, the coded-aperture may be an amplitude-only optical element or a combination amplitude/phase optical element, and respective, alternative illustrative systems may incorporate same. For example, FIG. 1B shows an alternative illustrative coded-aperture imaging system 100-2 in which the coded-aperture 50-1 is a programmable reflective-type liquid crystal, such as the Holoeye HEO 1080P programmable spatial light modulator. Each pixel of the modulator can be programmed to phase change over a range of $2\pi$ and thus can be used as a reflective phase plate. In the experimental setup shown in FIG. 1B, each pixel of the spatial light modulator was 8 µm; the fill factor was 85%; and a 0-$2\pi$ phase modulation was at $\lambda$=0.633 µm. Detector pixels were 13 µm. The object was located 1275 mm from the phase screen and the phase screen to detector separation was 204.4 mm The aperture was 5.5 mm×5.5 mm.

Figure 8:
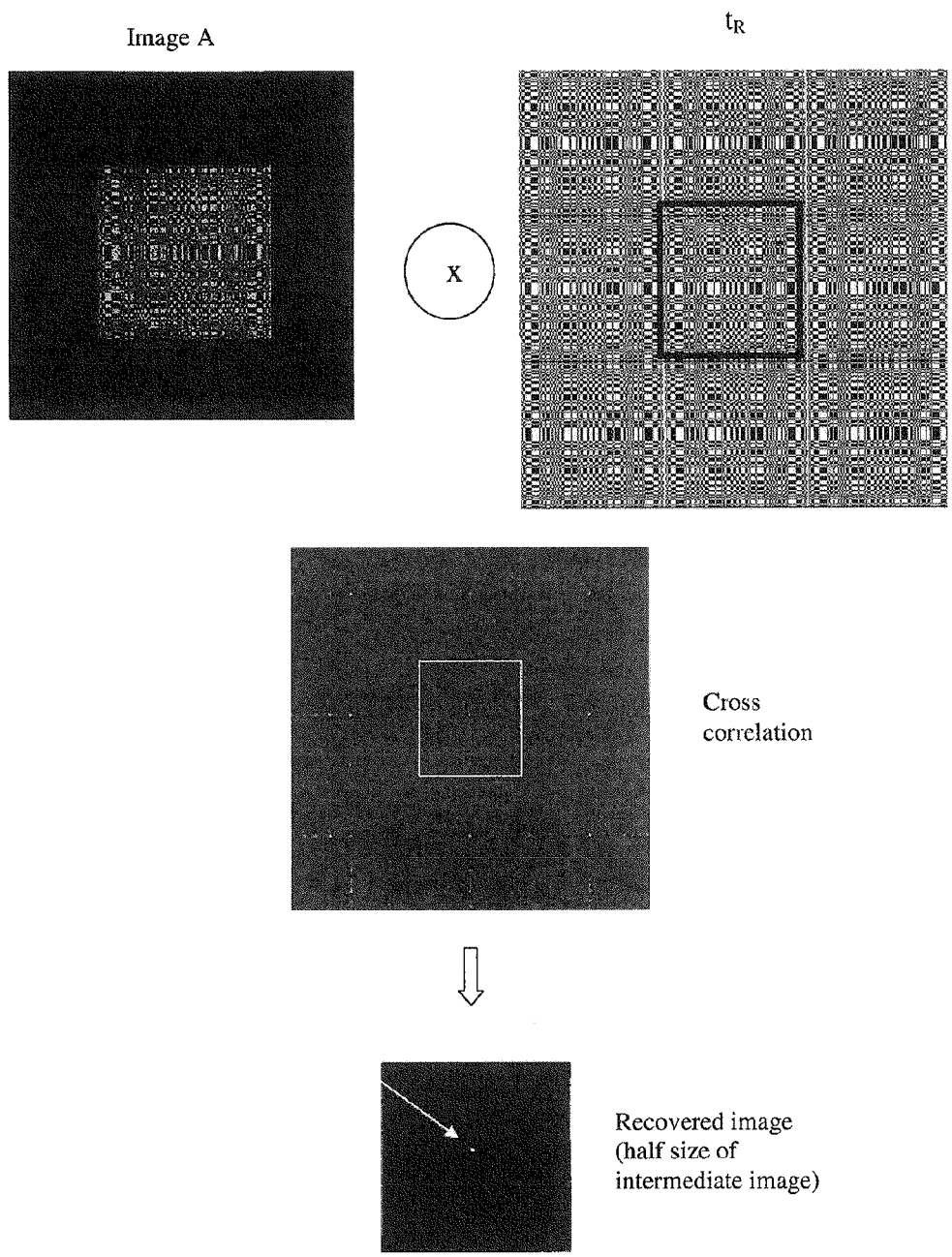
FIG. 8 shows a point source object and image recovery using the system illustrated in FIG. 1B, according to an illustrative embodiment of the invention.

FIG. 8 shows a point source image and recovery using the experimental system setup 100-2 shown in FIG. 1B and the phase retrieval method 500 illustrated in FIG. 5.

Fabrication of transmission-type or reflection-type coded-aperture optical elements as embodied herein can be made using photolithographic processes well known in the semiconductor art. Once a master is made via photolithography, quantities of coded-aperture optical elements can be made by well known molding processes. Transmission-type elements may be made using dielectric materials such as glass and plastic, for example. Reflection-type elements can be made from a variety of metals or other materials that can be reflection coated.

All references, including publications, patent applications, and patents cited herein are hereby incorporated by reference in their entireties to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including", and "containing" are to be construed as open-ended terms (i.e., meaning "including, but not limited to", ) unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

We claim:

1. An optical element for generating a band-limited uniformly redundant array (bl-URA) from light within a spectrum of focusable radiation, comprising:
    an optical element characterized by a light transmission function, $P(\xi, \eta)$, such that light within the spectrum of focusable radiation incident on the optical element from a point location in an object space of the optical element is optically transformed by $P(\xi, \eta)$ into a band-limited uniformly redundant array (bl-URA), $A(x,y)$, in an image space of the optical element.

2. The optical element of claim 1, wherein the optical element consists of a single optical element.

3. The optical element of claim 1, wherein the optical element has a surface region that is at least partially transmissive for the light within the spectrum of focusable radiation.

4. The optical element of claim 1, wherein the optical element has a surface region that is at least partially reflective for the light within the spectrum of focusable radiation.

5. The optical element of claim 1, wherein the optical element is an amplitude-only aperture.

6. The optical element of claim 1, wherein the optical element is a phase-only aperture.

7. The optical element of claim 1, wherein the optical element is a combination amplitude/phase aperture.

8. The optical element of claim 1, wherein the optical element consists of a refractive optical component.

9. The optical element of claim 1, wherein the optical element consists of a plurality of refractive optical components.

10. The optical element of claim 1, wherein the optical element comprises a refractive optical component and a phase aperture.

11. The optical element of claim 1, wherein the optical element is a programmable spatial light modulator.

12. The optical element of claim 1, wherein the optical element has Cartesian x,y surface dimensions equal to or greater than one millimeter, respectively.

13. The optical element of claim 1, wherein $A(x,y)$ is a real, non-negative, band-limited, uniformly redundant array (bl-URA).

14. The optical element of claim 1, wherein the spectrum of focusable radiation is in a range from ultraviolet to sub-millimeter wavelengths.

15. The optical element of claim 14, wherein the spectrum of focusable radiation is in a range from visible to infrared wavelengths.

16. An optical imaging device, consisting of:
    an optical element characterized by a light transmission function, $P(\xi, \eta)$, such that light within the spectrum of focusable radiation incident on the optical element from a point location in an object space of the optical element is optically transformed by $P(\xi, \eta)$ into a band-limited uniformly redundant array (bl-URA), $A(x,y)$, in an image space of the optical element;
    a detector disposed in the image space such that the bl-URA is formed on the detector; and
    an image processor adapted to recover an image of an object from the detected bl-URA.

17. The optical imaging device of claim 16, wherein $A(x,y)$ is a real, non-negative, intensity pattern and the optical element characterized by $P(\xi, \eta)$ has a finite aperture size.

18. The optical imaging device of claim 16, wherein $A(x,y)$ is a convolution of a binary function $t(x,y)$ for uniformly redundant array with a non-negative, bandlimited blocking function $b(x,y)$, as follows:

$$A(x,y) = \iint t(\xi, \eta) b(x-\xi, y-\eta) d\xi d\eta \triangleq t(x,y) * b(x,y),$$

where * is the convolution operation.

19. The optical imaging device of claim 18, wherein $A(x,y)$ is a point spread function $p(x,y)$ described by:

$$p(x,y) = [\Lambda(x/\Delta_x)\Lambda(y/\Delta_y)] * b(x,y),$$

$$p(x,y) = \iint [\Lambda(x'/\Delta_x)\Lambda(y'/\Delta_y)] b(x-x', y-y') dx' dy',$$

where $\Lambda(x) = \max(1-|x|, 0)$ is a triangle function and $\Delta_x$ and $\Delta_y$ are the smallest feature size of the bl-URA in x and y directions, respectively, at the detector.

20. The optical imaging device of claim 18, wherein the bandlimited blocking function $b(x,y)$ is an Airy disc for a circular aperture.

21. The optical imaging device of claim 20, wherein the bl-URA has a cut-off frequency as follows:

$$2\Delta_x f_{xMax} \approx 1 \text{ and } 2\Delta_y f_{yMax} \approx 1,$$

where $f_{xMax}$, $f_{yMax}$ are the largest spatial frequency of $b(x,y)$ in x and y directions, respectively, at the detector.

22. The optical imaging device of claim 16, wherein $A(x,y)$ at the detector has an x-dimension and a y-dimension that are equal to or less than a total size X/2 and Y/2, respectively, where the detector has a size of X×Y.

23. The optical imaging device of claim 16, wherein the object is a continuous object.

24. The optical imaging device of claim 17, wherein the optical element and the detector are separated by a distance, z, that is less than the finite aperture size of the optical element.

25. The optical imaging device of claim 16, wherein the device is a computational imaging camera.

26. A method for determining a transmission function $P(\xi, \eta)$ for an optical element that will generate a desired intensity pattern $A(x,y)$ on a detector from light within a spectrum of focusable radiation from a point on an object, comprising:
    a) determining a real, non-negative, band-limited uniformly redundant array, $A(x,y)$, that will be generated on a detector by an optical element characterized by a transmission function $P(\xi, \eta)$, from light within the spectrum of focusable radiation from a point on the object;
    b) defining an electric field having an amplitude $E(x,y) = [A(x,y)]^{1/2}$;
    c) calculating the transmission function $P(\xi, \eta)$ in a plane immediately adjacent a known position of the optical element by performing a free space back propagation, and denoting the transmission function $|P(\xi, \eta)| \exp[i\phi(\xi, \eta)]$;
    d) determining an electric field at a known detector plane location by performing a free space propagation, and denoting this electric field $F(x,y) \exp[i\psi(x,y)]$;
    e) applying a detector plane intensity constraint by setting $F(x,y) \to [A(x,y)]^{1/2}$;
    f) performing another free space back propagation; and
    g) calculating the optical element transmission function $P(\xi, \eta)$ that will generate the desired intensity pattern $A(x,y)$.

27. The method of claim 26, further comprising:
    c1) after step (c), setting an aperture constraint such that $|P(\xi, \eta)|$ is set to 1, wherein the optical element is a phase-only element; and
    h) repeating steps (c-f).

28. The method of claim 26, further comprising:
    c1) in step (c), setting $\phi(\xi, \eta)$ to 0, wherein the optical element is an amplitude-only element; and
    h) repeating steps (c-f).

* * * * *